United States Patent
Raghavan et al.

(10) Patent No.: US 7,167,299 B1
(45) Date of Patent: Jan. 23, 2007

(54) METHOD AND APPARATUS FOR CONTROLLING PUMP POWERS OF BROADBAND RAMAN AMPLIFIERS IN OPTICAL TRANSMISSION SYSTEMS INCORPORATING VIRTUAL CHANNELS TO REDUCE NOISE

(75) Inventors: Narasimhan Raghavan, Piscataway, NJ (US); David A Sadler, Holmdel, NJ (US); Christopher Alan White, Neshanic Station, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/343,647

(22) Filed: Jan. 31, 2006

(51) Int. Cl.
*H01S 3/00* (2006.01)
*H04B 17/00* (2006.01)

(52) U.S. Cl. .......................... 359/334; 398/31
(58) Field of Classification Search ............... 359/334; 398/31
See application file for complete search history.

(56) References Cited

U.S. PATENT DOCUMENTS

| | | | | |
|---|---|---|---|---|
| 6,366,728 B1 * | 4/2002 | Way et al. | ............... | 385/123 |
| 6,417,958 B1 * | 7/2002 | Du et al. | ............... | 359/334 |
| 6,424,455 B1 * | 7/2002 | Dmitri | ............... | 359/334 |
| 6,611,370 B2 | 8/2003 | Namiki et al. | ............... | 359/334 |
| 6,636,659 B2 * | 10/2003 | Kagi et al. | ............... | 385/24 |
| 6,674,568 B2 | 1/2004 | Liu | ............... | 359/334 |
| 6,697,187 B2 | 2/2004 | Seydnejad et al. | ............... | 359/334 |
| 6,734,954 B2 * | 5/2004 | Reepschlager et al. | ............... | 356/73.1 |
| 6,839,523 B1 * | 1/2005 | Roberts | ............... | 398/177 |
| 6,867,906 B2 * | 3/2005 | Eder et al. | ............... | 359/334 |
| 6,912,084 B2 | 6/2005 | Freund | ............... | 359/334 |
| 7,038,843 B2 * | 5/2006 | Denkin et al. | ............... | 359/337.11 |
| 7,054,058 B2 * | 5/2006 | Bock et al. | ............... | 359/334 |
| 7,068,421 B2 * | 6/2006 | Tokura et al. | ............... | 359/334 |
| 2003/0174387 A1 * | 9/2003 | Eggleton et al. | ............... | 359/334 |

OTHER PUBLICATIONS

Grant, Andrew. Calculating the Raman Pump Distribution to Achieve Minimum Gain Ripple. IEEE Journal of Quantum Electronics, vol. 38, No. 11, Nov. 2002.*
Giltrelli et al. Semianalytical Approach to the Gain Ripple Minimizatin in Multiple Pump Fiber Raman Amplifiers. IEEE Photonics Technology Letters. vol. 16. No. 11. Nov. 2004.*
Fludger et al. Ultra-wide bandwidth Raman Amplifiers. OFCC 2002. Mar. 17-22, 2002. pp. 60-62.*

(Continued)

*Primary Examiner*—Deandra M. Hughes
(74) *Attorney, Agent, or Firm*—Kenneth M. Brown

(57) ABSTRACT

A method and apparatus for controlling the pump powers of a broadband DWDM optical system using Raman amplification which determines pump settings that are advantageously directed to minimizing the peak-to-peak ripple of the channel powers with respect to a given per-channel target. The illustrative method and apparatus first formulates a linear programming optimization problem, and then solves the formulated linear program in order to derive a new set of pump powers to be applied to the Raman amplification pumps. In accordance with the principles of the invention, the formulated linear programming optimization problem advantageously includes one or more "virtual" channels in addition to the actual channels used in the optical transmission system. The linear program may be solved with use of any conventional linear programming solution technique, such as, for example, the simplex method.

20 Claims, 4 Drawing Sheets

OTHER PUBLICATIONS

Hasegawa, A., "Numerical Study of Optical Soliton Transmission Amplified Periodically by the Stimulated Raman Process", Appl. Opt., vol. 23, No. 19, pp. 3302-3309, 1984.

Kidorf, H. et al., "Pump Interactions In a 100-nm Bandwidth Raman Amplified", IEEE Phton. Technol. Lett., vol. 11, No. 5, pp. 530-532, 1999.

Liu, X., A Fast Control Algorithm For Achieving Flat Broadband Raman Gain With Multiple Pumps, Technical Memorandum No. 10009609-010115-48TM, Bell Laboratories, Lucent Technologies, USA, 2001.

Mollenauer, L. et al., "Soliton Propagation In Long Fibers With Periodically Compensated Loss", IEEE J. Quantum Electron., vol. QE-22, No. 1, pp. 157-173, 1986.

Mollenauer, L. et al., "Demonstration of Soliton Transmission Over More Than 4000 km in Fiber with Loss Periodically Compensated by Raman Gain", Opt. Letters, vol. 13, No. 8, pp. 675-677, 1988.

Namiki, S. et al., "Ultrabroad-Band Raman Amplifiers Pumped and Gain-Equalized by Wavelenth-DivisionMultiplexed High-Power Laser Diodes", IEEE J. Select. Topics Quantum Electron., vol. 7, No. 1, pp. 3-16, 2001.

Perlin, V.E. et al., "On Distributed Raman Amplification for Ultrabroad-Band Long-Haul WDM Systems", J. Lightwave Technol., vol. 20, No. 3, pp. 409-416, 2002.

Perlin, V.E. et al., "Optical Design of Flat-Gain Wide-Band Fiber Raman Amplifiers", J. Lightwave Technol., vol. 20, 2, pp. 250-254, 2002.

Yan, M. et al., "Automatic Design Scheme for Optical-Fiber Raman Amplifiers Backward-Pumped With Multiple Lasewr Diode Pumps", IEEE Phton. Technol. Lett., vol. 13, No. 9, pp. 948-950, 2001.

Zhou, X. et al., "A Simplified Model and Optical Design of a Multiwavelength Backward-Pumped Fiber Raman Amplifier", IEEE Photon. Technol. Lett., vol. 13, No. 9, pp. 945-947, 2001.

* cited by examiner

METHOD AND APPARATUS FOR CONTROLLING PUMP POWERS OF BROADBAND RAMAN AMPLIFIERS IN OPTICAL TRANSMISSION SYSTEMS INCORPORATING VIRTUAL CHANNELS TO REDUCE NOISE

FIELD OF THE INVENTION

The present invention relates generally to the field of optical transmission systems using broadband Raman amplifiers to compensate for fiber loss in such systems, and more particularly to a method and apparatus for reducing noise in Raman pump power optimization techniques with the incorporation of virtual channels.

BACKGROUND OF THE INVENTION

The demand for communication systems with higher capacities has pushed the common design approaches of WDM (wavelength-division-multiplexed) optical systems to their limits. (WDM optical systems are fully familiar to those of ordinary skill in the art.) A typical configuration of a point-to-point WDM system includes a number of optical transmitters, optical multiplexers, spans of transmission fiber, optical amplifiers (traditionally, erbium-doped fiber amplifiers, or EDFAs), dispersion compensating devices, optical demultiplexers, and a number of optical receivers. Unfortunately, the usable gain bandwidth for the optical amplifiers typically used in current systems, such as, for example, EDFAs, is limited and not very broad, and the distortion of the signal does not allow for transmission over very long optical transmission links. This has led to the investigation of alternate methods for amplification with greater broadband capabilities that allow for longer spacing in between amplification and longer transmission distances. Optical systems with such broadband capabilities are commonly referred to as DWDM (dense wavelength-division-multiplexed) systems.

It has long been known that stimulated Raman scattering, which is a well-known physical phenomenon, can be employed to build amplifiers to compensate for fiber loss in optical transmission systems. In particular, Raman amplification, which is fully familiar to those of ordinary skill in the art, advantageously uses the fiber itself as the amplification medium. Specifically, high-power (Raman) pump waves are launched into a silica fiber at a wavelength lower than that of the signal(s) to be amplified. Amplification then occurs when the pump wavelength gives up its energy to create new photons at the signal wavelength(s).

In recent years, there has been increased interest in the possible practical uses of Raman amplification techniques. There are at least two primary reasons for this renewed interest. First, the Raman effect has a very broad gain curve, which makes it very attractive for today's broadband DWDM systems, fully familiar to those of ordinary skill in the art. And second, Raman amplification typically requires pumps with outputs of several hundreds of milliwatts. Semiconductor pump lasers with such power outputs have only recently become available, and thus Raman amplification has now become practical.

FIG. 1, for example, shows a typical Raman gain curve, normalized so that the maximal gain is one, for a Raman pump operating at 205 THz (TeraHertz). Also shown is an illustrative set of channel frequencies in a typical state-of-the-art DWDM system. Illustratively, there are 128 channels, from 186.50 THz to 192.85 THz, with 50 GHz (Gigahertz) spacing between them. As can be seen from the figure, even a single Raman pump provides gain for a large part of the signal band.

Moreover, even broader Raman gain bandwidth can then be achieved by combining the Raman amplification effect of multiple pump waves selected carefully for the wavelength domain. FIG. 2, for example, shows an illustrative set of 6 Raman gain curves, each operating at a different frequency, which together provide gain throughout the entire desired signal band. Thus, by employing a small number (e.g., 6) of Raman pumps, each operating at a different frequency, it is possible to provide sufficient gain throughout the entire desired signal band.

As indicated above, Raman amplifiers for broadband systems typically employ multiple pumps. However, despite the advantages of Raman-pumped DWDM systems, there are some degradation effects which occur. For example, in addition to the desired pump-to-signal power transfer, there also exist pump-to-pump and signal-to-signal power transfers. These unwanted power transfers introduce gain tilting in such a way that signals at longer wavelengths may experience stronger gain than those at shorter wavelengths. This effect leads to non-uniform gain and thus the non-uniform linear penalty and noise level across the signal wavelengths. Additionally, power fluctuations over time within the Raman pump wave, which often occurs, may lead to amplified fluctuations or jitter, which also degrades system performance.

For at least these reasons, it has been recognized that it would be advantageous to adjust the powers of the pumps in Raman-pumped DWDM systems dynamically, so that signal powers are as flat as possible, relative to some given power target. One such recently developed technique for performing Raman pump power control to achieve such gain flattening is disclosed in U.S. Pat. No. 6,674,568, issued to X. Liu on Jan. 6, 2004 (hereinafter "Liu"), and commonly assigned to the assignee of the present invention. The technique of Liu uses a simple feedback mechanism based on the measured signal powers in order to adjust the pumps. More particularly, the Liu approach adapts the Raman pump powers (and, in certain embodiments thereof, the pump wavelengths as well), based on a closed-form mathematical formula which depends upon differences between a desired gain profile and a determined gain profile. U.S. Pat. No. 6,674,568 is hereby incorporated by reference as if fully set forth herein.

Note, however, that the technique as disclosed in Liu has certain limitations. First, it typically requires a number of feedback iterations for the pump settings to converge. Second, it can be determined that the effect of the Liu procedure is to approximately minimize the deviation of the signal powers from the target in a least-squares sense (i.e., to minimize the sum of the squares of the differences between the actual signal power at a given frequency and the target signal power at that frequency), even though it would be more advantageous to minimize the peak-to-peak ripple of the signal powers (i.e., to minimize the difference between the maximum difference between the actual signal power a given frequency and the target signal power at that frequency, and the minimum difference between the actual signal power at a given frequency and the target signal power at that frequency). In fact, it can be shown that the use of a least-squares minimization achieves a less desirable result than the use of a peak-to-peak ripple minimization, which difference may be potentially significant, especially as the number of signal channels increases. And third, when the number of channels exceeds the number of pumps (as is typical), there are channel configurations with arbitrary large ripple that lie in a certain null space of the least-squares formulation and thus cannot be corrected by the relatively simple feedback approach of Liu. Although it is possible to overcome the problem of slow convergence with a straight-forward modification of the Liu technique, even after such a modification, the result nonetheless comprises a least-squares minimization approach.

In U.S. Pat. No. 6,912,084, issued to R. Freund on Jun. 28, 2005 (hereinafter, "Freund") and commonly assigned to the assignee of the present invention, an improvement on the technique on of Liu is provided with use of a method and apparatus for controlling the pump powers of a broadband DWDM optical system using Raman amplification which determines pump settings that are advantageously directed to minimizing the peak-to-peak ripple of the channel powers with respect to a given per-channel target. More specifically, the method and apparatus disclosed in Freund first formulates a linear programming optimization problem, and then solves the formulated linear program in order to derive a new set of pump powers to be applied to the Raman amplification pumps. (As is well known to those skilled in the art, a linear programming optimization problem comprises an objective function to be optimized together with a set of constraints.) The optimization problem developed by the technique of Freund may then be solved with use of any conventional linear programming solution technique, such as, for example, the simplex method (which is fully familiar to those of ordinary skill in the art), thus providing Raman pump power settings to obtain an optimal gain profile. U.S. Pat. No. 6,912,084 is hereby incorporated by reference as if fully set forth herein.

However, a problem exists with the method of Freund in how the algorithm treats portions of the frequency spectrum which do not contain any active channels. The method disclosed in Freund simply ignores this region of the spectrum, and as such, changes to the Raman pumps can increase the amplification of this region of the spectrum leading to the growth of unwanted noise. Typically, this occurs because one of the Raman pumps has little or no impact on the active channels. Thus, the linear program of Freund can set this pump arbitrarily high since it will not change the gain at the active channels and thus will not change the value of the objective function. Unfortunately, this pump increase will impact the gain profile in the unoccupied channel region, resulting in amplification of background noise.

One method of combating this problem with the Freund method would be to add actual channels to this region of the spectrum. In this manner, the added channels enter the optimization problem and thus decrease the growth of noise. However, additional hardware, which can be quite expensive, would be required to light and maintain this power to these additional channels.

SUMMARY OF THE INVENTION

We have recognized that the above described problem with the Freund method may be overcome by advantageously adding "virtual" channels in the unused region of the spectrum and including them in the description of the linear program to be solved. In this manner, the goals of providing optimal gain to the "real" channels reducing the noise power contained within the "virtual" channels (i.e., within the unused region of the spectrum) can be advantageously and simultaneously achieved.

Specifically, in accordance with certain illustrative embodiments of the present invention, a method and apparatus is provided for controlling the pump powers of a broadband DWDM optical system using Raman amplification which determines pump settings that are advantageously directed to minimizing the peak-to-peak ripple of the channel powers with respect to a given per-channel target. More particularly, the illustrative method and apparatus first formulates a linear programming optimization problem, and then solves the formulated linear program in order to derive a new set of pump powers to be applied to the Raman amplification pumps. In accordance with the principles of the present invention, the formulated linear programming optimization problem advantageously includes one or more "virtual" channels in addition to the actual channels of the optical system. Illustratively, the linear program may be solved with use of any conventional linear programming solution technique, such as, for example, the simplex method (which is fully familiar to those of ordinary skill in the art).

In particular, and in accordance with the illustrative embodiment of the present invention, a set of virtual channels is defined as a set of points in the spectrum where one would ideally like to minimize noise. This set of virtual channels is then provided to the control algorithm (i.e., the procedure which solves the linear programming optimization problem). For example, the maximum reduction in gain obtained for the linear Raman model at these virtual channels may be added to the objective function derived with use of the Freund technique. (Note that the addition of this information will not only advantageously limit pump changes which amplify noise, it can also advantageously reduce the noise located at these positions within the spectrum.)

In accordance with one illustrative embodiment of the present invention, a single virtual channel is used to reduce the noise over a range of frequencies roughly equivalent to the amplification bandwidth of a single Raman pump. (Note that for most situations of interest a single virtual channel will suffice, although additional channels only slightly increase the computational cost of the algorithm and have no detrimental impact on the performance, since the algorithm advantageously addresses the single virtual channel with the largest drop in gain.) In addition, in accordance with one illustrative embodiment of the present invention, an adjustable parameter is used to balance the need to minimize noise against the need to achieve a desired target gain. Note that ideally, and often in practice, the region containing channels and where one needs to minimize noise are advantageously separated enough that these goals do not often compete.

DETAILED DESCRIPTION OF THE ILLUSTRATIVE EMBODIMENTS

An illustrative Raman-Pumped DWDM System for use by the Present Invention

Figure 1:
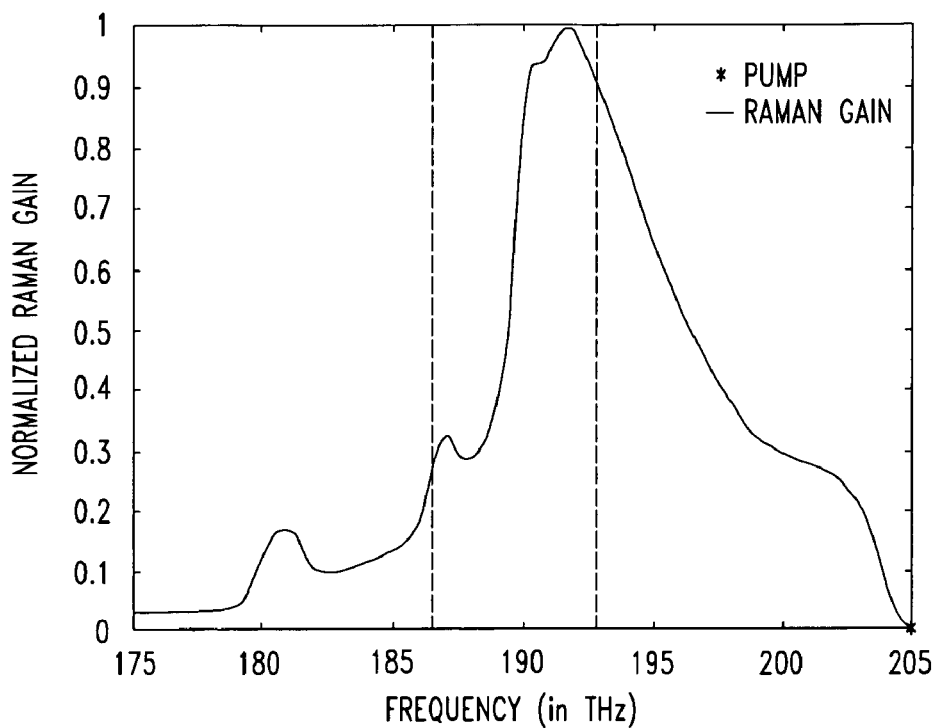
FIG. 1 shows a typical Raman gain curve, normalized so that the maximal gain is one, for an illustrative Raman pump operating at 205 THz.
Figure 2:
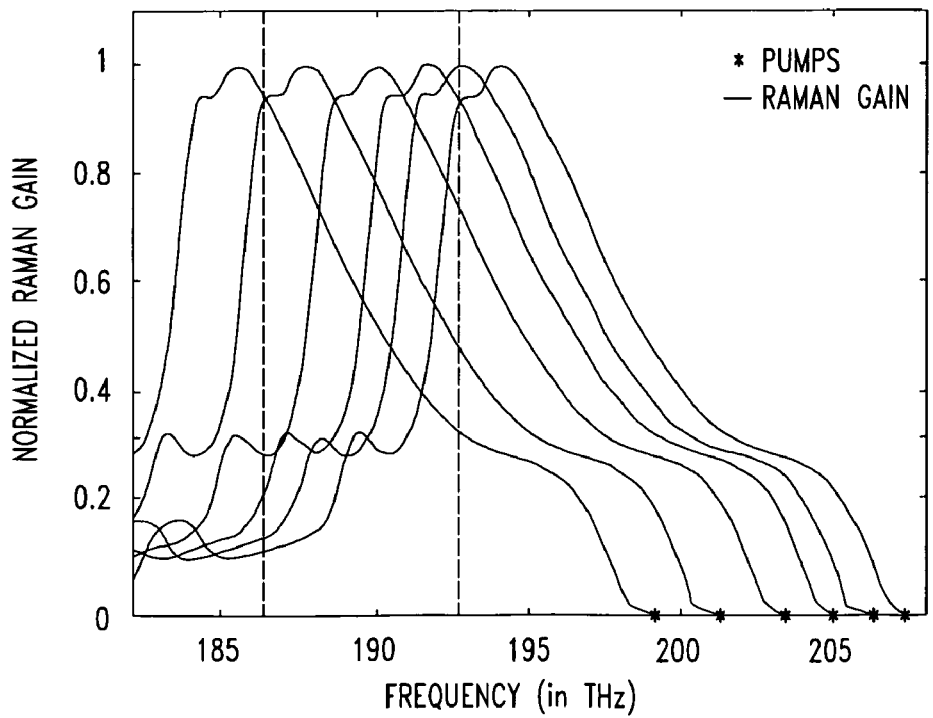
FIG. 2 shows an illustrative set of 6 Raman gain curves, each operating at a different frequency, which together provide gain throughout an entire desired signal band.
Figure 3:
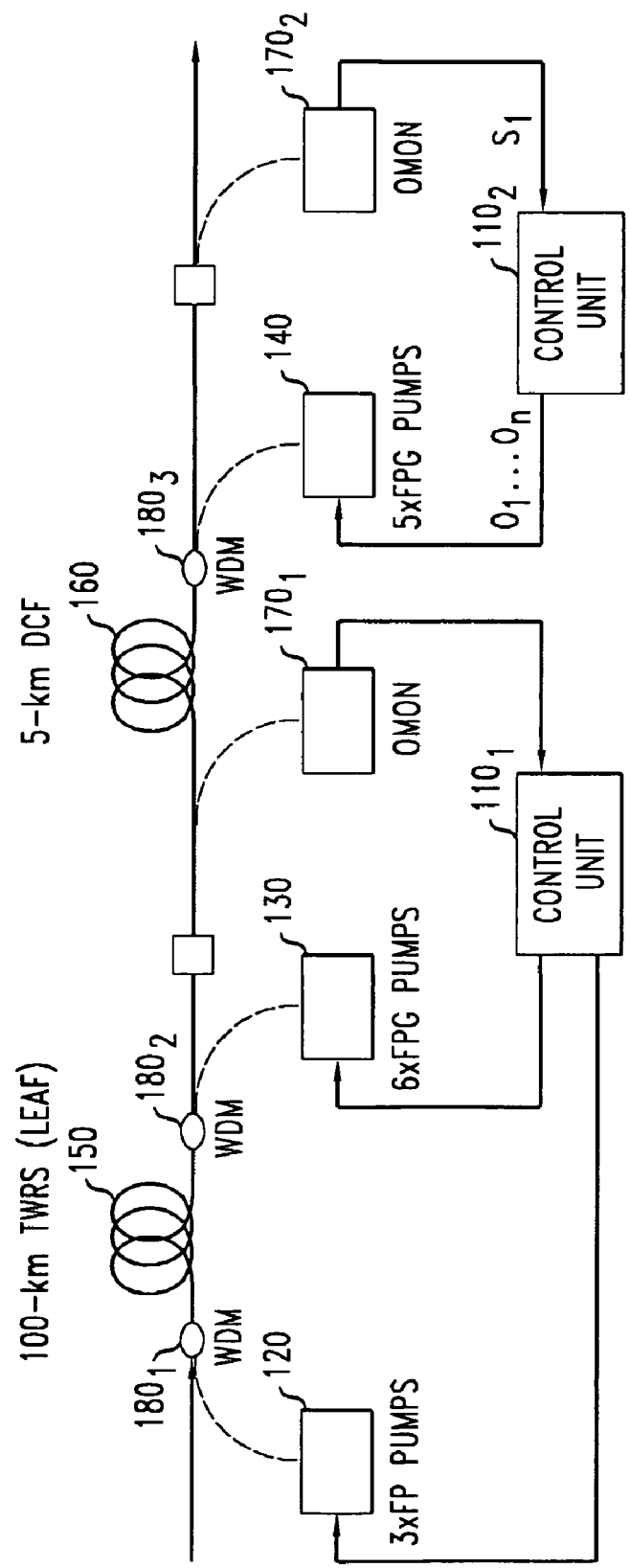
FIG. 3 shows a span of an illustrative Raman-pumped DWDM system in which an illustrative embodiment of the present invention may be advantageously employed.

FIG. 3 shows a span of an illustrative Raman-pumped dense wavelength-division-multiplexed (DWDM) system 100 in which an illustrative embodiment of the present invention may be advantageously employed. The DWDM system 100 of FIG. 3 illustratively provides amplification of optical signals in two sections, namely a 100-km true wave reduced slope (TWRS) fiber 150, and a dispersion-compensating fiber (DCF) 160. Power profiles of the amplified optical signals are advantageously measured by optical channel monitors (OMONs), subsequent to the two sections, and may be used to calculate parameters advantageously employed to achieve broadband Raman gain flattening. (True wave reduced slope fibers, dispersion-compensating fibers, and optical channel monitors are all conventional and fully familiar to those of ordinary skill in the art.)

Briefly stated, optical signals enter DWDM system 100. The signals are then amplified in the 100-km TWRS 150 and the power profile is subsequently measured by a first optical channel monitor (OMON) 170₁. The optical signals then proceed to DCF 160 where they are again amplified and the power profile is again subsequently measured by second OMON 170₂. The optical signals then proceed on through the DWDM system 100.

System 100 of FIG. 3 includes two control units 110₁ and 110₂, a set of forward Raman pumps 120 (illustratively three), a first set of backward Raman pumps 130 (illustratively six), a second set of backward Raman pumps 140 (illustratively five), a TWRS 150 (illustratively 100-km), a dispersion-compensating fiber (DCF) 160 (illustratively 5-km), two optical channel monitors (OMONs) 170₁ and 170₂, and three wavelength-division-multiplexers (WDMs) 180₁, 180₂, and 180₃ for coupling the Raman pump waves into system 100.

As can be seen from FIG. 3, all entering optical signals pass through the 100-km TWRS 150, where they are amplified by the three forward Raman pumps 120 and the six backward Raman pumps 130. The Raman pump waves of the Raman pump sets 120 and 130 are coupled into the 100-km TWRS by WDMs 180₁ and 180₂. The six backward Raman pumps 130 are advantageously divided into two groups, each of three equally frequency-spaced pumps. The first set of backward Raman pumps 130 are implemented to advantageously reduce WDM loss in the span due to noise nonlinearity caused by power fluctuations in the pumps. After the optical signal is amplified, a first gain profile is determined by the first OMON 170₁. The optical signals then proceed to the, illustratively, 5-km DCF 160. In the DCF 160, the second set of backward Raman pumps 140 amplify the optical signals again. The second set of backward Raman pumps 140 include a group in which three of the five pumps used are equally spaced in frequency. All of the five backward Raman pumps used in this second set 140 are used for pumping the dispersion-compensating fiber (DCF) 160. The Raman pump waves of the five backward Raman pumps 140 are coupled into the 100-km TWRS by the WDM 180₃. After the optical signal is amplified, a second gain profile is determined by the second OMON 170₂. The optical signals then continue through the span of the system 100.

In accordance with an illustrative embodiment of the present invention, the determinations provided by the OMONs 170₁ and 170₂ are advantageously transmitted back to control units 110₁ and 110₂, respectively. (In another illustrative embodiment of the present invention, the measurements from both of the OMONs 170₁ and 170₂ are sent to a single two-channel control unit). These determinations may, for example, include data reflecting signal powers, pump wavelengths, and other system parameters. The control units 110₁ and 110₂ advantageously process the information from the OMONs 170₁ and 170₂ and calculate the appropriate Raman pump powers for gain flattening across the system, in accordance with the principles of the present invention, and illustratively in accordance with the method described in detail below.

Briefly, control units 110₁ and 110₂ utilize power spectrum data provided by the OMONs 170₁ and 170₂ respectively, to responsively adjust the pump powers of all of the Raman pumps (illustratively, Raman pumps 120, 130, and 140) in a manner tending to produce a relatively flat gain profile (or other desired gain profile). The control function of the exemplary embodiment includes a negative feedback loop that automatically adjusts Raman pump powers based on signal power profile. In the DCF, the output signal profile is advantageously used as the input to the DCF and gain flattening is then performed according to the output signal profile from the DCF.

Figure 4:
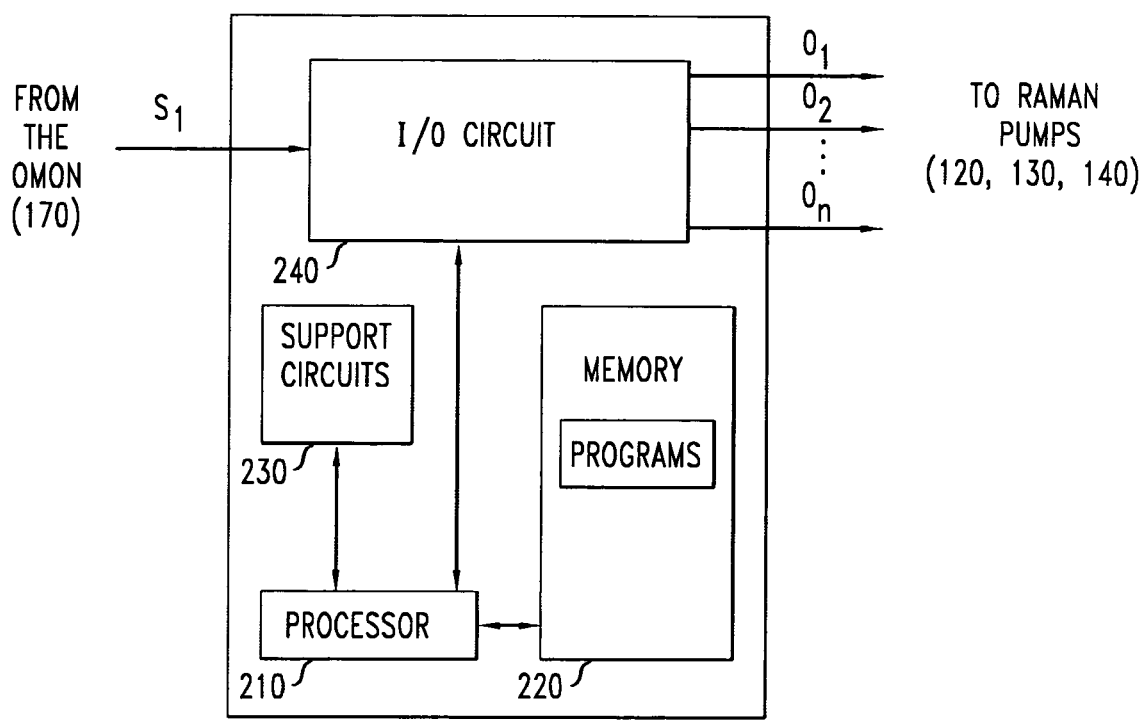
FIG. 4 shows a high-level block diagram of a control unit suitable for use in a system for controlling the pump powers of a Raman-pumped DWDM optical system in accordance with an illustrative embodiment of the present invention.

FIG. 4 shows a high-level block diagram of a control unit suitable for use in a system for controlling the pump powers of a Raman-pumped DWDM optical system in accordance with an illustrative embodiment of the present invention. More specifically, the control unit shown in FIG. 4 comprises an illustrative embodiment of a control unit suitable for use in the all-Raman-pumped DWDM system 100 of FIG. 3. The control unit 110 of FIG. 4 illustratively comprises processor 210, as well as memory 220 for storing software and/or firmware implementations of the present invention and other control programs. Processor 210 advantageously cooperates with conventional support circuitry 230 such as power supplies, clock circuits, cache memory and the like, as well as circuits that assist in executing the software/firmware routines stored in memory 220. Control unit 110 also advantageously contains input-output circuitry 240 that forms an interface between the various functional elements communicating with the control unit 110. For example, in the illustrative embodiment of the present invention as shown in FIG. 4, control unit 110 advantageously communicates with one of the OMON 170 devices via a signal path SI and to each of a plurality of Raman pumps via signal paths $O_1$–$O_1$.

An Optimization Problem to be Solved According to one Illustrative Embodiment

Following the notation and disclosure of the optimization problem (i.e., linear program) described in (incorporated by reference) U.S. Pat. No. 6,912,084 (i.e., Freund), we present an optimization problem (i.e., linear program) in accordance with an illustrative embodiment of the present invention. Specifically, the following notation of variables (with corresponding definitions) will be used herein:

$\sigma_1$: Maximum positive channel deviation from target
$\sigma_2$: Maximum negative channel deviation from target
$\sigma_1$: Maximum absolute value of suggested pump change
$\beta$: Regularization parameter δ: Maximum allowed pump change—trust radius
$e^{(len)}$: Unit Vector of 1's having a length of (len)
d: Vector (m) of suggested pump changes
y: Vector (n) of real channel powers
M: Matrix (n×m) representing linear Raman model
n: Number of real channels
m: Number of pumps
Δ: Allowed "float" from target
p: Number of virtual channels
N: Matrix (p×m) representing linear Raman model
$\sigma_4$: Largest decrease in virtual channel power
γ: Coefficient which balances Virtual and Non-Virtual channel optimization.

Then, according to one illustrative embodiment of the present invention, the following optimization problem (i.e., linear program) may be advantageously specified:

Minimize $\sigma_1 - \sigma_2 + \beta\sigma_3 + \gamma\sigma_4$ (1)

over all $\sigma_1, \sigma_2, \sigma_3, \sigma_4 \in R, d \in R^m$ with $\sigma_1 e^{(n)} - Md \leq y^{target} - y^{old}$ (2)

$\sigma_2 e^{(n)} + Md \leq y^{old} - y^{target}$ (3)

$-\sigma_3 e^{(m)} \leq d \leq \sigma_3 e^{(m)}$ (4)

$\Delta^{min} \leq \frac{1}{2}(\sigma_1 + \sigma_2) \leq \Delta^{max}$ (5)

$\rho^{old} - \rho^{max} \leq d \leq \rho^{old} - \rho^{min}$ (6)

$-\delta e^{(m)} \leq d \leq \delta e^{(m)}$ (7)

$-\sigma_4 e^{(p)} - Nd \leq 0$ (8)

Note that, in accordance with the illustrative embodiment of the present invention, as compared to the optimization problem disclosed in Freund (U.S. Pat. No. 6,912,084, incorporated by reference herein), we have added an additional variable, $\sigma_4$, defined by (i.e., constrained by) equation 8, as well as an additional term incorporating that additional variable to the objective function (i.e., Equation 1). In practice, $\sigma_4$ advantageously represents the largest decrease in virtual channel power. As defined above, $e^{(p)}$ is a unit vector of length p where p is the number of virtual channels in the system. N, like M, is a representation of the linearized Raman model; however it only contains the model as evaluated at the virtual channel(s).

Because the pumping effects are rather broad, one need only set a single virtual channel in an unused portion of the spectrum to achieve the desired noise reduction when using the above-described linear program. (The addition of more virtual channels will not harm the ability of the algorithm to reduce the noise gain, but will add minor computational cost to the solution of the linear program.) Thus, in accordance with one illustrative embodiment of the present invention, only a single virtual channel is used—that is, p=1.

The definition of the illustrative linear program of Equations (1) through (8) advantageously ensures that $\sigma_4$ will contain the largest possible decrease in power for any of the virtual channels. By adding the term $\gamma\sigma_4$ to the objective function of Equation (1), we effectively and advantageously drive the system to decrease the power in the virtual channels by decreasing the amount of gain in these channels. Note that if, for example, we set γ=0, or, alternatively, we define no virtual channels whatsoever, we obtain the linear program disclosed in Freund. Note also that if we set γ to be very large (e.g., greater than 100), noise reduction will dominate the objective function and the system will essentially ignore the gain targets, thereby setting the pumps in a manner that minimizes the gain at the virtual channel locations. Note that in such a hypothetically large γ regime, the linear program will begin to shutdown the pumps, since this most effectively reduces the amount of total gain, but at the expense of not achieving the target gain for the active channels.

Specifically therefore, in accordance with illustrative embodiments of the present invention, a value of γ is advantageously selected to balance the need to reduce noise against the desire to achieve a target gain profile. In particular, a value of 0.1 (dB ripple/dB noise) may be selected in accordance with one illustrative embodiment of the present invention. Such a value may be interpreted as a "willingness" to trade 1 dB of ripple error (i.e., $\sigma_1 - \sigma_2$) for every 10 dB of noise reduction (i.e., $\sigma_4$). Note that in practice, the most significant noise problems arise when the pumps that are causing the noise growth do not contribute to the amplification of the signal powers. In such a "decoupled" case, no trade off is required and the illustrative method of the present invention will effectively and advantageously minimize both the peak-to-peak ripple and the noise.

In other illustrative embodiments of the present invention, the value of γ may be dynamically modified during each iteration (see below) of a pump power control process. For example, such a modification may be based on upon the current peak-to-peak ripple value during each such iteration.

Figure 5:
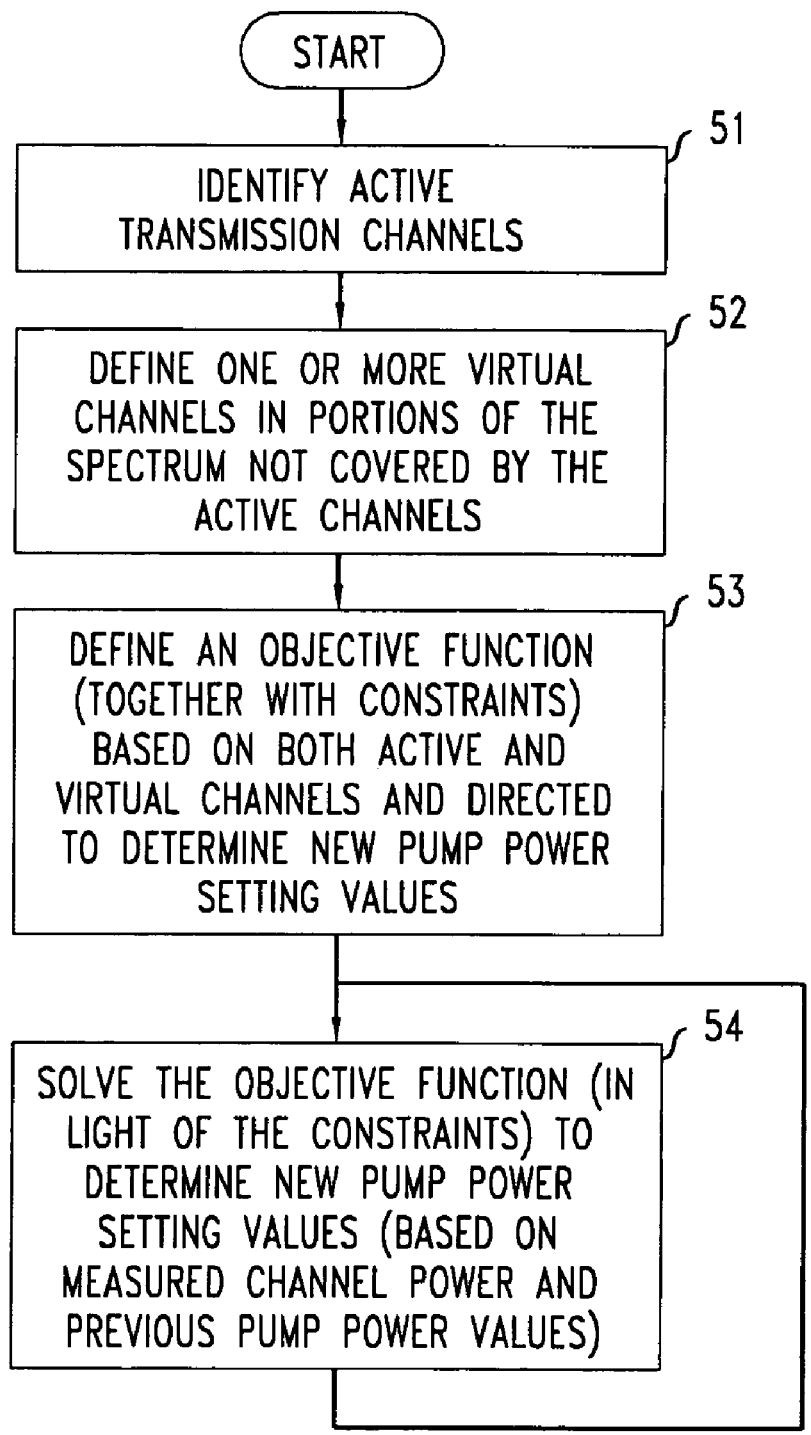
FIG. 5 shows a flowchart of the operation of a method for controlling the pump powers of a Raman-pumped DWDM optical system which includes at least one virtual channel in accordance with an illustrative embodiment of the present invention.

A method for Controlling the Pump Powers of a Raman-Pumped DWDM System According to an Illustrative Embodiment of the Present Invention In accordance with an illustrative embodiment of the present invention, a Raman pump control algorithm is advantageously implemented as an iterative procedure which, at each iteration, computes a suggested pump change by solving a linear program (LP), and then returns a new pump setting. At least one virtual channel is added to the set of actual channels in accordance with the principles of the present invention. FIG. 5 shows a flowchart of the operation of such a method for controlling the pump powers of a Raman-pumped DWDM optical system which includes at least one virtual channel in accordance with an illustrative embodiment of the present invention.

Specifically, as shown in FIG. 5, the illustrative method first identifies the active transmission channels (block 51), and then defines at least one virtual channel in a portion of the spectrum not covered by the active channels (block 52). Then, based on both the active and the virtual channels, the illustrative method defines an objective function (and one or more constraints associated therewith) directed to determining new pump power setting values (block 53). Illustratively, the objective function (together with the constraints) may comprise a linear program (i.e., a linear programming optimization problem). Finally, the illustrative method solves the objective function (in light of the constraints) to determine new pump power setting values (block 54). Illustratively, these new values are determined based on measured channel power values as well as on previous pump power setting values.

Note that the process of solving the objective function (e.g., the linear program), as shown in block 54 of FIG. 5, may be advantageously performed iteratively such that, at each iteration, a new set of pump power setting values are computed. In particular, in accordance with the benefits of the illustrative embodiment of the present invention, these new pump power setting values advantageously minimize the peak-to-peak ripple of the channel power values (with respect to one or more channel power target values) associated with the active channels, and also maximize the decrease in channel power channel power values associated with the virtual channels (thereby minimizing noise).

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. In addition, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

We claim:

1. A method for determining one or more Raman pump powers for use in an optical transmission system employing Raman amplification, the optical transmission system operating over a predetermined spectrum and comprising a plurality of active transmission channels covering less than all of said spectrum, the method comprising the steps of:
    defining one or more virtual channels in a portion of said predetermined spectrum not covered by said plurality of active transmission channels;
    defining an objective function directed to determining one or more new pump power setting values, the objective function based on one or more of said active transmission channels and further based on at least one of said one or more virtual channels;
    solving the objective function to thereby determine the one or more new pump power setting values; and
    setting one or more Raman pumps to said one or more new pump power setting values.

2. The method of claim 1 wherein the objective function is based on one or more channel power values associated with one or more corresponding ones of said plurality of active transmission channels, and is further based on one or more channel power values associated with said one or more virtual channels.

3. The method of claim 2 wherein said objective function is directed to maximizing a decrease in said one or more channel power values associated with said one or more virtual channels.

4. The method of claim 3 wherein the step of defining an objective function comprises formulating a linear programming optimization problem directed to determining said one or more new pump power setting values, and wherein the step of solving the objective function comprises determining a solution to said linear programming optimization problem.

5. The method of claim 4 wherein the step of solving the objective function comprises solving the linear programming optimization problem with use of a simplex method-based technique.

6. The method of claim 3 wherein the objective function is directed to determining the one or more new pump power setting values which substantially minimize a peak-to-peak ripple of the one or more channel power values with respect to one or more channel power target values.

7. The method of claim 3 wherein the objective function is directed to determining one or more pump power change values representing differences between the one or more new pump power setting values and one or more previous pump power setting values.

8. The method of claim 7 wherein the objective function is directed to determining the one or more pump power change values which substantially minimize a sum of:
    (i) a peak-to-peak ripple of the one or more channel power values with respect to one or more channel power target values, and
    (ii) a function of said one or more pump power change values.

9. The method of claim 2 wherein said one or more channel power values associated with said active transmission channels and said one or more channel power values associated with said one or more virtual channels have been determined with use of one or more optical channel monitors.

10. The method of claim 1 wherein the optical transmission system uses a wavelength-division-multiplexing technique.

11. An apparatus for determining one or more Raman pump powers for use in an optical transmission system employing Raman amplification, the optical transmission system operating over a predetermined spectrum and comprising a plurality of active transmission channels covering less than all of said spectrum, the apparatus comprising a processor and a memory, wherein the memory comprises computer executable code which when executed will:
    define one or more virtual channels in a portion of said predetermined spectrum not covered by said plurality of active transmission channels;
    define an objective function directed to determining one or more new pump power setting values, the objective function based on one or more of said active transmission channels and further based on at least one of said one or more virtual channels; and
    solve the objective function to thereby determine the one or more new pump power setting values.

12. The apparatus of claim 11 wherein the objective function is based on one or more channel power values associated with one or more corresponding ones of said plurality of active transmission channels, and is further based on one or more channel power values associated with said one or more virtual channels.

13. The apparatus of claim 12 wherein said objective function is directed to maximizing a decrease in said one or more channel power values associated with said one or more virtual channels.

14. The apparatus of claim 13 wherein the defining of an objective function comprises formulating a linear programming optimization problem directed to determining said one or more new pump power setting values, and wherein the solving of the objective function comprises determining a solution to said linear programming optimization problem.

15. The apparatus of claim 14 wherein the solving of the objective function comprises solving the linear programming optimization problem with use of a simplex method-based technique.

16. The apparatus of claim 13 wherein the objective function is directed to determining the one or more new pump power setting values which substantially minimize a peak-to-peak ripple of the one or more channel power values with respect to one or more channel power target values.

17. The apparatus of claim 13 wherein the objective function is directed to determining one or more pump power change values representing differences between the one or more new pump power setting values and one or more previous pump power setting values.

18. The apparatus of claim 17 wherein the objective function is directed to determining the one or more pump power change values which substantially minimize a sum of:
(i) a peak-to-peak ripple of the one or more channel power values with respect to one or more channel power target values, and
(ii) a function of said one or more pump power change values.

19. The apparatus of claim 12 wherein said one or more channel power values associated with said active transmission channels and said one or more channel power values associated with said one or more virtual channels have been determined with use of one or more optical channel monitors.

20. The apparatus of claim 11 wherein the optical transmission system uses a wavelength-division-multiplexing technique.

* * * * *